(12) United States Patent
Matovsky et al.

(10) Patent No.: US 11,750,389 B2
(45) Date of Patent: *Sep. 5, 2023

(54) SYSTEM, METHOD, AND COMPUTER PROGRAM PRODUCT FOR PERFORMING HARDWARE BACKED SYMMETRIC OPERATIONS FOR PASSWORD BASED AUTHENTICATION

(71) Applicant: DIGITAL 14 LLC, Abu Dhabi (AE)

(72) Inventors: Michael Matovsky, Vaughan (CA); Ravi Singh, Toronto (CA); Alexander Sherkin, Vaughan (CA)

(73) Assignee: DIGITAL 14 LLC, Abu Dhabi (AE)

( * ) Notice: Subject to any disclaimer, the term of this patent is extended or adjusted under 35 U.S.C. 154(b) by 182 days.

This patent is subject to a terminal disclaimer.

(21) Appl. No.: 17/485,080

(22) Filed: Sep. 24, 2021

(65) Prior Publication Data

US 2022/0014375 A1 Jan. 13, 2022

Related U.S. Application Data

(63) Continuation of application No. 16/352,498, filed on Mar. 13, 2019, now Pat. No. 11,159,325.

(51) Int. Cl.
| | |
|---|---|
| *H04L 9/32* | (2006.01) |
| *H04L 9/08* | (2006.01) |
| *H04L 9/40* | (2022.01) |

(52) U.S. Cl.
CPC .......... *H04L 9/3226* (2013.01); *H04L 9/0819* (2013.01); *H04L 9/3242* (2013.01); *H04L 63/1466* (2013.01)

(58) Field of Classification Search
CPC ..................................... H04L 9/3226
See application file for complete search history.

(56) References Cited

U.S. PATENT DOCUMENTS

| | | | | |
|---|---|---|---|---|
| 8,028,166 | B2 * | 9/2011 | Thibadeau | H04L 9/0838 |
| | | | | 713/153 |
| 9,015,489 | B2 * | 4/2015 | Belenkiy | H04L 63/0428 |
| | | | | 713/182 |
| 9,071,972 | B1 * | 6/2015 | Wang | H04L 41/5019 |
| 9,237,133 | B2 * | 1/2016 | Kruglick | H04L 63/0428 |
| 9,548,984 | B2 * | 1/2017 | Fries | G05B 19/4183 |
| 2003/0165242 | A1 * | 9/2003 | Walker | H04L 9/0618 |
| | | | | 380/277 |
| 2006/0149962 | A1 * | 7/2006 | Fountain | H04L 63/06 |
| | | | | 713/151 |

* cited by examiner

*Primary Examiner* — Simon P Kanaan
(74) *Attorney, Agent, or Firm* — Zilka-Kotab, P.C.

(57) ABSTRACT

A system, method, and computer program product are provided for implementing hardware backed symmetric operations for password based authentication. In operation, a system receives a request to access software utilizing password-based authentication. Further, the system receives a password for the password-based authentication. The system computes a hash utilizing the password and a hardware-based authenticator associated with hardware of the system utilizing hardware backed symmetric encryption. Moreover, the system verifies that the hash computed utilizing the password and the hardware-based authenticator is correct for accessing the software.

20 Claims, 6 Drawing Sheets

SYSTEM, METHOD, AND COMPUTER PROGRAM PRODUCT FOR PERFORMING HARDWARE BACKED SYMMETRIC OPERATIONS FOR PASSWORD BASED AUTHENTICATION

RELATED APPLICATION(S)

This application is a continuation of U.S. patent application Ser. No. 16/352,498 filed Mar. 13, 2019, the entire contents of which are incorporated herein by reference.

FIELD OF THE INVENTION

The present invention relates to securing systems from malicious attacks, and more particularly to performing hardware-backed password-based authentication to secure systems from offline malicious attacks.

BACKGROUND

Currently, systems have to rely on password-based authentication because of its simplicity. However, password-based authentication is vulnerable to offline attacks. If an attacker obtains access to a password hash, an attacker can brute force through the password space until a match is found.

Using modern hardware that an attacker controls (e.g. a GPU or specialized hardware, etc.), an attacker is able to check billions of password guesses per second. Hence, password-based systems are vulnerable to offline brute force attacks.

There are many existing solutions that attempt to address offline brute force attacks targeting password-based authentication systems. However, each of these solutions has flaws.

There is thus a need for addressing these and/or other issues associated with the prior art.

SUMMARY

A system, method, and computer program product are provided for implementing hardware backed symmetric operations for password based authentication. In operation, a system receives a request to access software utilizing password-based authentication. Further, the system receives a password for the password-based authentication. The system computes a hash utilizing the password and a hardware-based authenticator associated with hardware of the system utilizing hardware backed symmetric encryption. Moreover, the system verifies that the hash computed utilizing the password and the hardware-based authenticator is correct for accessing the software.

DETAILED DESCRIPTION

Figure 1:
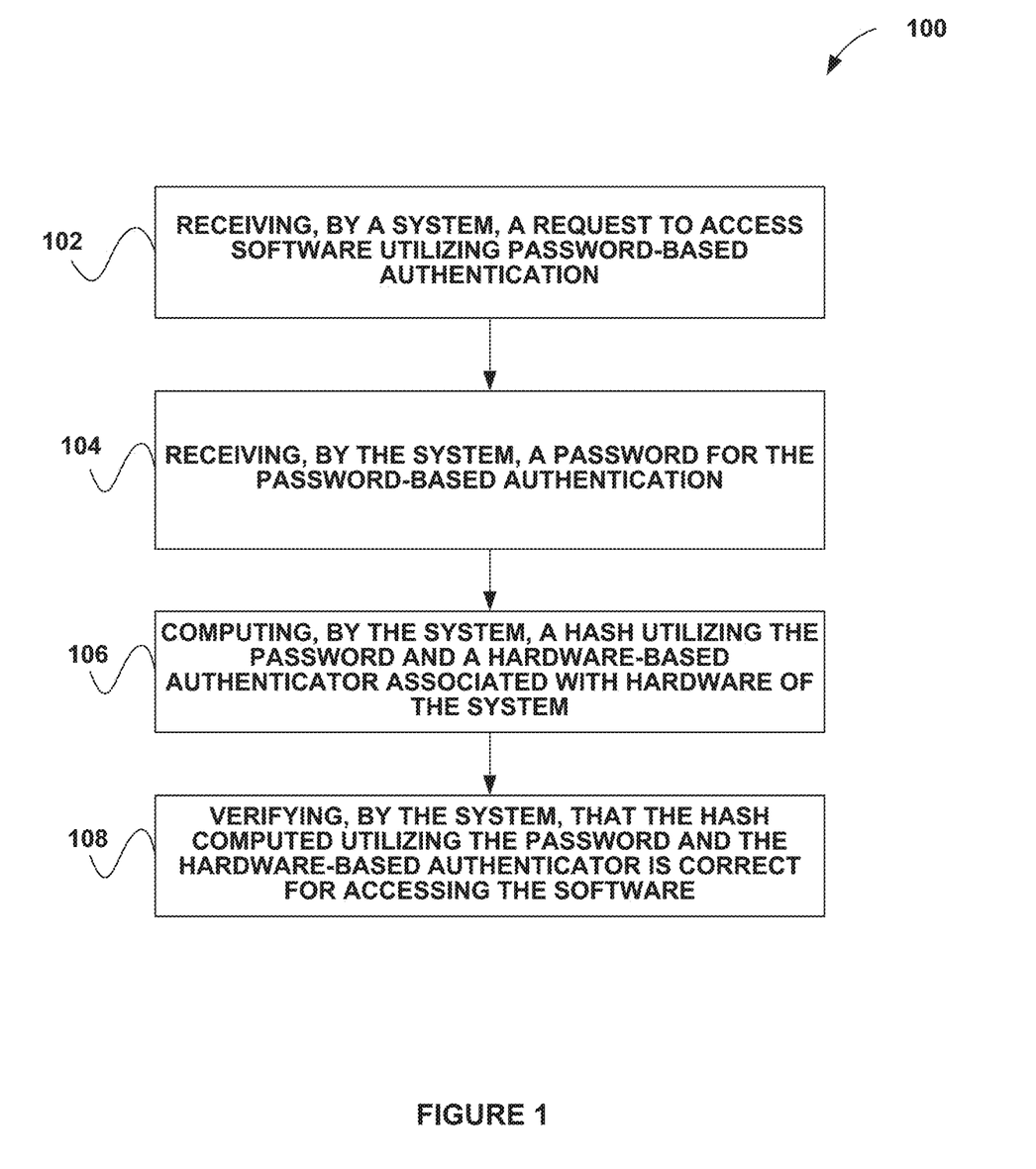
FIG. 1 shows a method for performing hardware-backed password-based authentication, in accordance with one embodiment.

FIG. 1 shows a method 100 for performing hardware-backed password-based authentication, in accordance with one embodiment.

In operation, a system receives a request to access software utilizing password-based authentication. See operation 102. The system may include any device on which a user can access software, such as a computer (e.g. tablet, laptop, desktop, etc.), a mobile phone, a gaming device, etc. The software may include any software that has the option for password-based authentication, such as an operating system or application, etc. In one embodiment, the system may receive the request to access the software from a user interface.

The system receives a password for the password-based authentication. See operation 104. The system may receive the password from a user interface, etc.

The system computes a hash utilizing the password and a hardware-based authenticator associated with hardware of the system. See operation 106. The hardware-based authenticator may include any authentication mechanism associated with hardware of the system. For example, the hardware-based authenticator may include a hardware-backed secret generated utilizing ARM TrustZone, Trusted Platform Module (TPM), a smart card, or various other technology.

ARM TrustZone technology refers to a system-on-chip (SoC) and CPU system-wide approach to security with hardware-enforced isolation to establish secure end points and a device root of trust. TPM is an international standard for a secure cryptoprocessor, a dedicated microcontroller designed to secure hardware through integrated cryptographic keys.

The system may compute the hash utilizing a variety of techniques, such as PBKDF2 (Password-Based Key Derivation Function 2), a key derivation function (KDF) algorithm, scrypt, etc. Scrypt is a password-based key derivation function. PBKDF2 (Password-Based Key Derivation Function 2) is a key derivation function with a sliding computational cost, aimed to reduce the vulnerability of encrypted keys to brute force attacks. A KDF derives one or more secret keys from a secret value such as a master key, a password, or a passphrase using a pseudorandom function.

Computing the hash utilizing the password and the hardware-based authenticator may include binding password hash computation to the hardware of the system. In this case, binding the password hash computation to the hardware of the system may include: generating a high entropy secret in a hardware-backed storage (e.g. such as a secret key or a private key); and adding a message authentication code (MAC) or a digital signature computation step to the password hash computation every iteration. A MAC refers to a short piece of information used for authentication.

Further, in one embodiment, adding the MAC or digital signature computation step to the password hash computation may include a pseudorandom function used for the password hash computation (e.g. in the case of PBKDF2 or scrypt, etc.) relying on a hardware-backed MAC or a hardware-backed digital signature.

In another embodiment, adding the MAC or digital signature computation step to the password hash computation may include adding a hardware-backed MAC or a hardware-backed digital signature as a pseudorandom function used by the password hash computation (e.g. in the case of KDF, etc.). Still yet, in one embodiment, computing the hash utilizing the password and the hardware-based authenticator may include computing the hardware-based authenticator prior to computing the hash.

The system verifies that the hash computed utilizing the password and the hardware-based authenticator is correct for accessing the software. See operation 108. For example, the system may check a hash associated with the software that is stored in memory of the system to determine whether the computed hash matches. The system may then grant access to the software if the stored hash matches the computed hash or, conversely, deny access to the software if the stored hash does not match the computed hash.

In one embodiment, the system implementing the method 100 may implement hardware backed symmetric operations for password based authentication. More information associated with implementing hardware backed symmetric operations for password based authentication is described with reference to FIG. 4.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
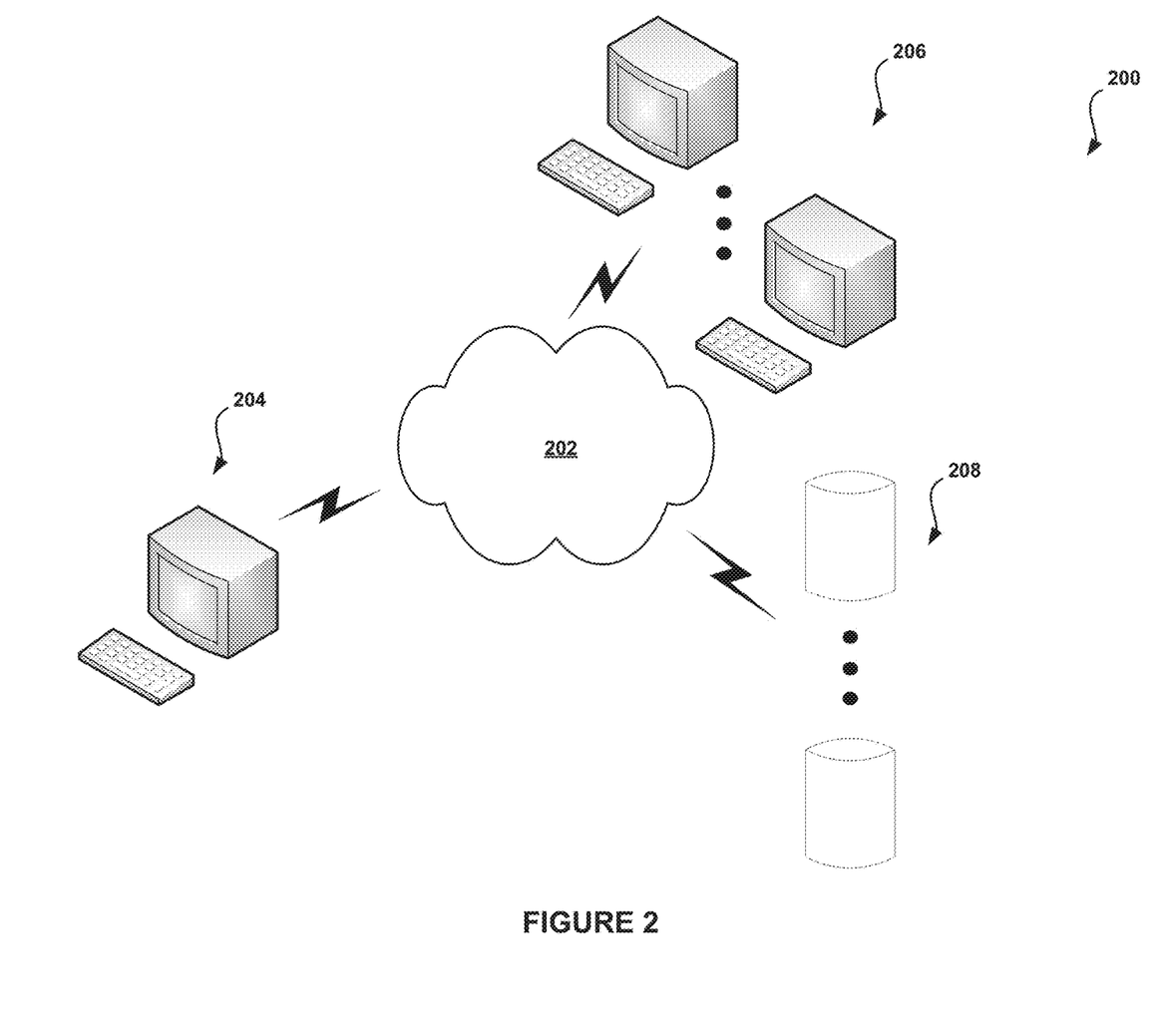
FIG. 2 shows a system for performing hardware-backed password-based authentication, in accordance with one embodiment.

FIG. 2 shows a system 200 for performing hardware-backed password-based authentication, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202. The system 204 may also be in communication with one or more repositories/databases 208. In operation, one or more of the systems 206 may attempt to access content (e.g. software applications, etc.) on the system 204. To ensure that a brute force attack is unsuccessful, the system 204 may implement a hardware-backed password-based authentication.

There are many existing solutions that attempt to address offline brute force attacks targeting password-based authentication systems. One approach is to apply a pseudorandom function multiple times so that checking each password guess becomes more computationally expensive. This is an addition of iterations.

Another approach is to introduce a parameter (i.e. a salt) to parameterize hash computation to prevent pre-computation/dictionary attacks. This parameter is random data that is used as an additional input to a one-way function that hashes data, a password, or passphrase.

Yet another approach is to use memory-hard key derivation function (KDF) algorithms that impose additional memory constraints that limit brute force attack scalability.

Even though the existing approaches make an offline brute force attack more computationally expensive, the offline brute force attacks are still very effective. The system 204 limits a brute force attack to the target device by including a computational step that has to be executed on the original hardware, hence reducing and adversary's computational capabilities. Also, hardware-backed key operations introduce time constraints on the brute force attacks because hardware-backed operations cannot be accelerated by an attacker.

For example, if the system 204 represents a mobile phone running a mobile phone application performing user authentication based on a password, the system 204 can implement a computational step that can only be performed by the hardware of the system 204, thus achieving hardware binding.

To achieve this hardware binding, in one embodiment, a hardware-backed secret may be used, and the hardware-backed secret based computation step may be included in password hash computation. In various embodiments, a hardware-backed secret based computation step may be facilitated by ARM TrustZone (e.g. Qualcomm Secure Execution Environment based), Trusted Platform Module (TPM), smart card, or various other technologies, etc.

In one embodiment, to bind password hash computation to a particular hardware, the system 204 may implement password authentication software that: 1) generates a high entropy secret in a hardware-backed storage (e.g. such as a secret key or a private key); 2) adds a message authentication code (MAC) or digital signature computation step to a password hash computation process to every iteration.

For example, if PBKDF2 is used, the pseudorandom function used for PBKDF may rely on a hardware-backed MAC or digital signature.

If a memory-hard KDF is used for password hashing such as scrypt, a MAC or digital signature may be added as the pseudorandom function. In case of scrypt, scrypt relies on PBKDF that may be tied to a hardware-backed secret.

By implementing the hardware-backed secret based computation step, an attacker cannot perform an offline attack because the attacker does not know the hardware-backed secret. Also, it is hard to guess the hardware-backed secret because the secret is a high entropy secret. Lifting the secret from the hardware is generally hard if hardware-backed facility is correctly implemented.

In one embodiment, the system 204 may implement hardware backed symmetric operations for password based authentication. More information associated with implementing hardware backed symmetric operations for password based authentication is described with reference to FIG. 4.

Figure 3:
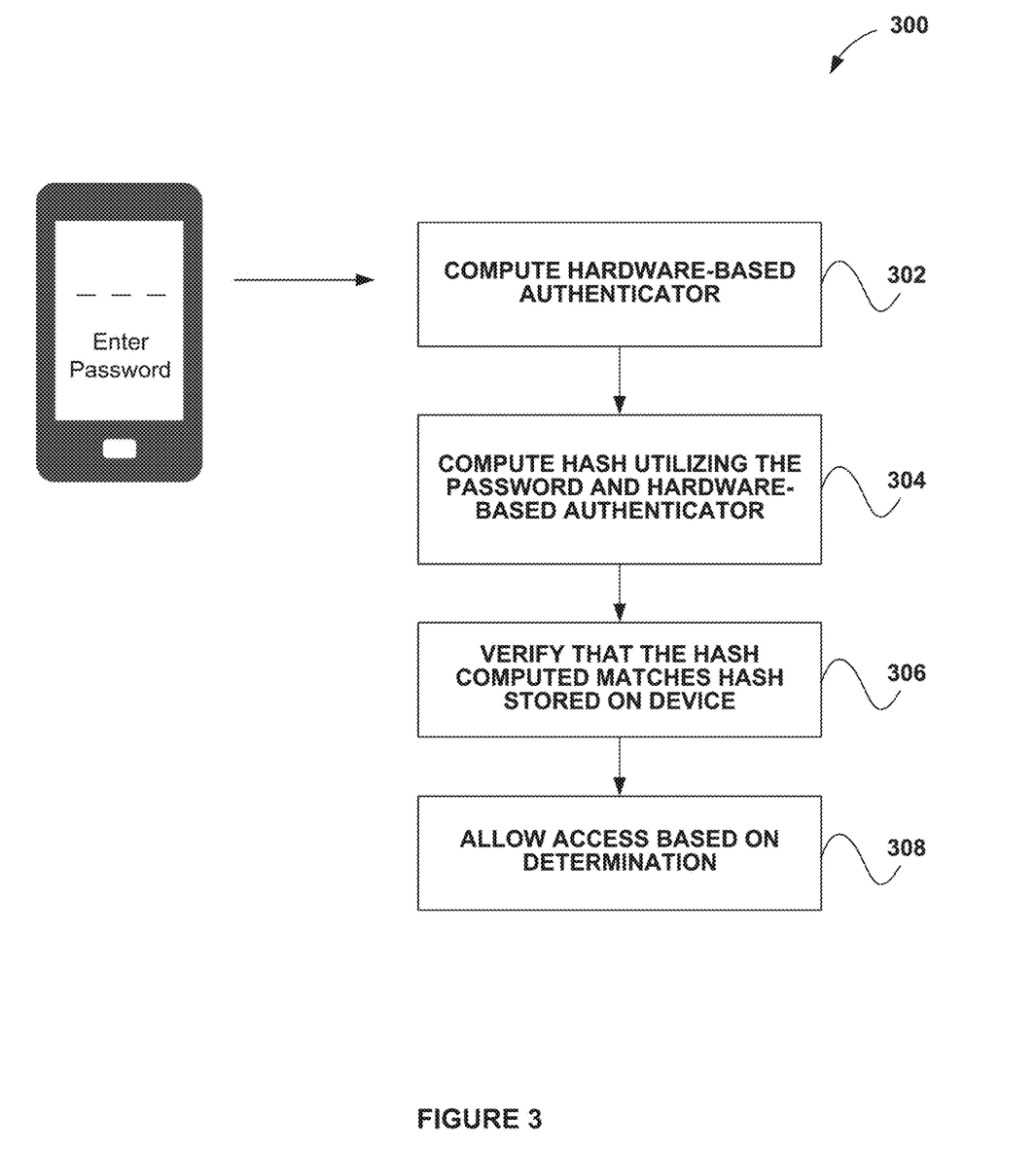
FIG. 3 shows a system flow diagram of a device implementing hardware-backed password-based authentication, in accordance with one embodiment.

FIG. 3 shows a system flow diagram 300 of a device implementing hardware-backed password-based authentication, in accordance with still yet another embodiment. As an option, the system flow diagram 300 may be carried out in the context of any of the previously described figures. Of course, however, the system flow diagram 300 may be carried out in any desired context. It should also be noted that the aforementioned definitions may apply during the present description.

As shown in FIG. 3, when a user of a mobile device desires to access software (e.g. an application, an operating system, etc.) on the device, the user may be prompted for a password. Once the device receives a password from the user, the device computes a hardware-based authenticator. See operation 302. The device then computes a hash utilizing the password and the hardware-based authenticator. See operation 304.

The device then verifies that the computed hash matches a hash associated with the software that is stored on the device in memory. See operation 306. The device allows access to the software if there is a match and does not allow access to the software if there is not a match. See operation 308.

This approach assumes that a suitable hardware backed secret-based function exists that can be used as a pseudorandom one-way function such as MAC or digital signature. However, it is possible that some systems will not provide a MAC or digital signature. Instead, only symmetric encryption/decryption may be available. If this is the case, symmetric encryption cannot be used in place of the pseudorandom function because the password hash will become reversible. Hence, a more sophisticated construction is required.

If an available hardware backed crypto module can only provide symmetric encryption algorithms, it is possible to leverage hardware-backed symmetric crypto for password-based authentication hardening.

In one embodiment, utilizing hardware-backed symmetric encryption as part of password hash computation may include replacing the traditional pseudorandom function used in password based key derivation schemes such as PBKDF2 with the following sequence of steps: 1) implement a traditional software-based one-way pseudorandom function, such as HMAC; 2) implement hardware-based symmetric encryption; and 3) implement a traditional software-based one-way pseudorandom function, such as HMAC.

In cryptography, an HMAC (sometimes expanded as either keyed-hash message authentication code or hash-based message authentication code) is a specific type of message authentication code (MAC) involving a cryptographic hash function and a secret cryptographic key.

The existence of the traditional software-based one-way pseudo-random function after encryption ensures that an attacker cannot compute the password from the hash in reverse. Note that one of the steps (1) or (3) may be dropped as desired. One application of a traditional software-based one-way pseudorandom function should be enough to prevent an attacker from reversing the password hash computation process.

Figure 4:
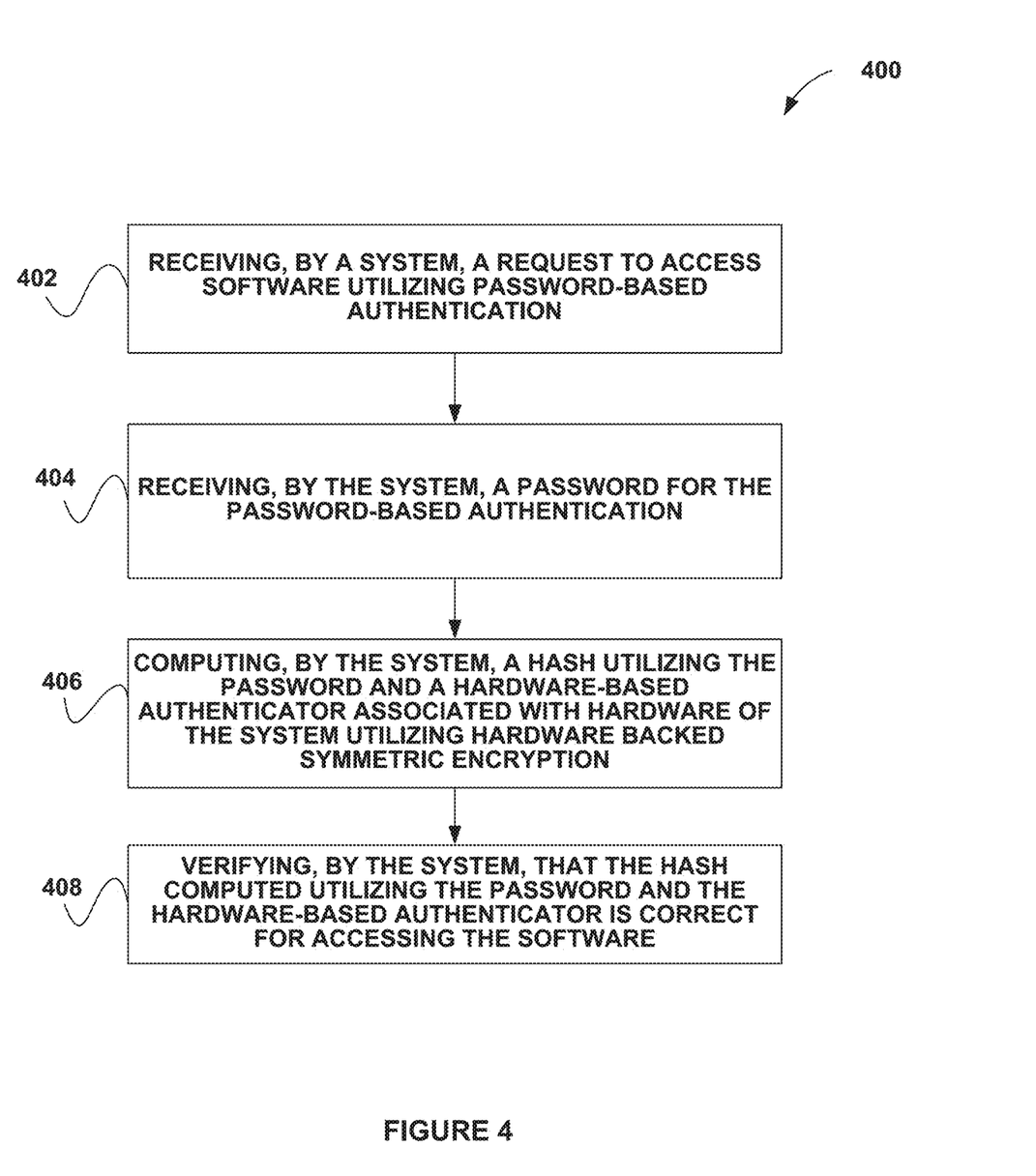
FIG. 4 shows a system flow diagram for implementing hardware backed symmetric operations for password based authentication, in accordance with one embodiment.

FIG. 4 shows a system flow diagram 400 for implementing hardware backed symmetric operations for password based authentication, in accordance with still yet another embodiment. As an option, the system flow diagram 400 may be carried out in the context of any of the previously described figures. Of course, however, the system flow diagram 400 may be carried out in any desired context. It should also be noted that the aforementioned definitions may apply during the present description.

As shown, a system receives a request to access software utilizing password-based authentication. See operation 402. The system may include any device on which a user can access software, such as a computer (e.g. tablet, laptop, desktop, etc.), a mobile phone, a gaming device, etc. The software may include any software that has the option for password-based authentication, such as an operating system or application, etc. In one embodiment, the system may receive the request to access the software from a user interface.

The system receives a password for the password-based authentication. See operation 404. The system computes a hash utilizing the password and a hardware-based authenticator associated with hardware of the system utilizing hardware backed symmetric encryption. See operation 406.

In one embodiment, computing the hash utilizing the password and the hardware-based authenticator may include: utilizing a first pseudorandom function to generate a hash of the password; performing a symmetric encryption to generate the hardware-based authenticator; and utilizing a second pseudorandom function utilizing the hash of the password and the symmetric encryption of the hardware-based authenticator. In one embodiment, the first pseudorandom function and the second pseudorandom function may be associated with HMAC.

The system verifies that the hash computed utilizing the password and the hardware-based authenticator is correct for accessing the software. See operation 408. For example, the system may check a hash associated with the software that is stored in memory of the system to determine whether the computed hash matches. The system may then grant access to the software if the stored hash matches the computed hash or, conversely, deny access to the software if the stored hash does not match the computed hash.

Figure 5:
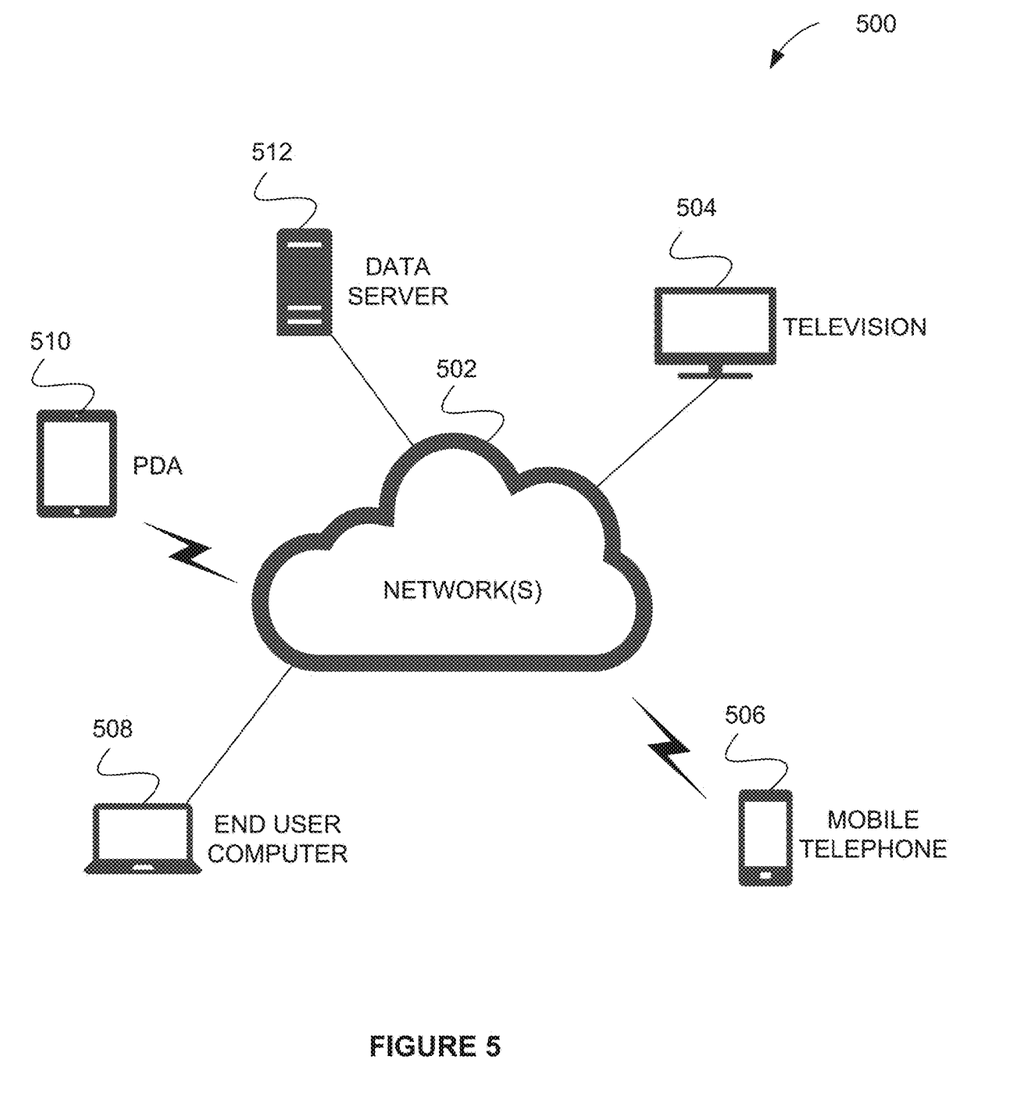
FIG. 5 illustrates a network architecture, in accordance with one embodiment.

FIG. 5 illustrates a network architecture 500, in accordance with one embodiment. As shown, at least one network 502 is provided. In various embodiments, any one or more components/features set forth during the description of any previous figure(s) may be implemented in connection with any one or more of the components of the at least one network 502.

In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and an end user computer 508 may be coupled to the network 502 for communication purposes. Such end user computer 508 may include a desktop computer, lap-top computer, and/or any other type of logic. Still yet, various other devices may be coupled to the network 502 including a personal digital assistant (PDA) device 510, a mobile phone device 506, a television 504, etc.

Figure 6:
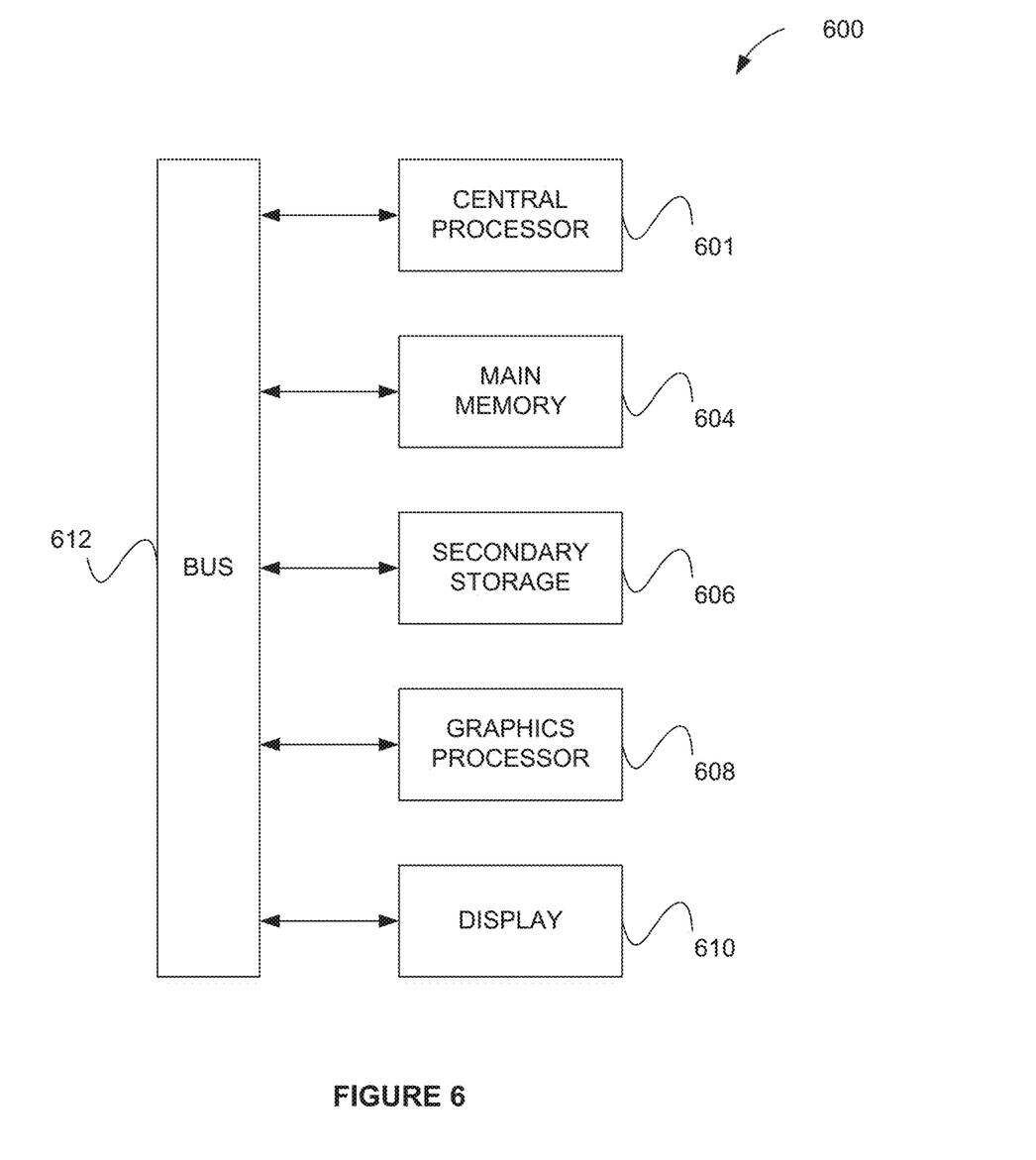
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. However, it is to be appreciated that the system 600 may be implemented in any desired environment.

As shown, a system 600 is provided including at least one central processor 602 which is connected to a bus 612. The system 600 also includes main memory 604 [e.g., hard disk drive, solid state drive, random access memory (RAM), etc.]. The system 600 also includes a graphics processor 608 and a display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 606, and/or any other memory, for that matter. Such computer programs, when executed, enable the system 600 to perform various functions (as set forth above, for example). Memory 604, secondary storage 606 and/or any other storage are possible examples of non-transitory computer-readable media.

In one embodiment, means in the form of the processor 602 (and/or different means corresponding to different components thereof) executes instructions in the memory 604 or in the secondary storage 606 to: receive a request to access software utilizing password-based authentication; receive a password for the password-based authentication; compute a hash utilizing the password and a hardware-based authenticator associated with hardware of the system; and verify that the hash computed utilizing the password and the hardware-based authenticator is correct for accessing the software.

Optionally, in any of the preceding embodiments, the hardware-based authenticator may include a hardware-backed secret generated utilizing one of: ARM TrustZone, Trusted Platform Module, or a smart card.

Optionally, in any of the preceding embodiments, computing the hash utilizing the password and the hardware-based authenticator associated with hardware of the system may include binding password hash computation to the hardware of the system.

Optionally, in any of the preceding embodiments, computing the hash utilizing the password and the hardware-based authenticator includes computing the hardware-based authenticator prior to computing the hash.

In another embodiment, means in the form of the processor 602 (and/or different means corresponding to different components thereof) executes instructions in the memory 604 or in the secondary storage 606 for: receiving, by a system, a request to access software utilizing password-based authentication; receiving, by the system, a password for the password-based authentication; computing, by the system, a hash utilizing the password and a hardware-based authenticator associated with hardware of the system utilizing hardware backed symmetric encryption; and verifying, by the system, that the hash computed utilizing the password and the hardware-based authenticator is correct for accessing the software.

Optionally, in any of the preceding embodiments, computing the hash utilizing the password and the hardware-based authenticator may include: utilizing a first pseudorandom function to generate a hash of the password; performing a symmetric encryption to generate the hardware-based authenticator; and utilizing a second pseudorandom function utilizing the hash of the password and the symmetric encryption of the hardware-based authenticator.

Optionally, in any of the preceding embodiments, the first pseudorandom function and the second pseudorandom function being associated with HMAC (keyed-hash message authentication code).

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
    receiving, by a system, a request to access software utilizing password-based authentication;
    receiving, by the system, a password for the password-based authentication;
    computing, by the system, a hash utilizing the password and a hardware-based authenticator associated with hardware of the system, wherein the hash is computed utilizing a combination of a single implementation of a hardware-based symmetric encryption algorithm provided by a hardware-backed cryptographic module of the system and a single implementation of a software-based one-way pseudorandom function; and
    verifying, by the system, that the hash computed utilizing the password and the hardware-based authenticator is correct for accessing the software.

2. The method of claim 1, wherein the hardware-based authenticator is generated after the password is received.

3. The method of claim 2, wherein the password is received from a user via a user interface.

4. The method of claim 1, wherein the hash is computed by utilizing the single implementation of the software-based one-way pseudorandom function after the single implementation of the hardware-based symmetric encryption algorithm.

5. The method of claim 4, wherein the single implementation of the hardware-based symmetric encryption algorithm is utilized to generate a symmetric encryption of the hardware-based authenticator.

6. The method of claim 5, wherein the single implementation of the software-based one-way pseudorandom function utilizes the password and the symmetric encryption of the hardware-based authenticator.

7. The method of claim 1, wherein the hash is computed by utilizing the single implementation of the software-based one-way pseudorandom function before the single implementation of the hardware-based symmetric encryption algorithm.

8. The method of claim 7, wherein the single implementation of the software-based one-way pseudorandom function generates a hash of the password.

9. The method of claim 8, wherein the single implementation of the hardware-based symmetric encryption algorithm generates a symmetric encryption of the hardware-based authenticator.

10. The method of claim 1, wherein the software-based one-way pseudorandom function is associated with HMAC (keyed-hash message authentication code).

11. A non-transitory computer readable medium storing computer code executable by a processor of a system to perform a method comprising:
    receiving a request to access software utilizing password-based authentication;
    receiving a password for the password-based authentication;
    computing a hash utilizing the password and a hardware-based authenticator associated with hardware of the system, wherein the hash is computed utilizing a combination of a single implementation of a hardware-based symmetric encryption algorithm provided by a hardware-backed cryptographic module of the system and a single implementation of a software-based one-way pseudorandom function; and
    verifying that the hash computed utilizing the password and the hardware-based authenticator is correct for accessing the software.

12. The non-transitory computer readable medium of claim 11, wherein the hardware-based authenticator is generated after the password is received.

13. The non-transitory computer readable medium of claim 12, wherein the password is received from a user via a user interface.

14. The non-transitory computer readable medium of claim 11, wherein the hash is computed by utilizing the single implementation of the software-based one-way pseudorandom function after the single implementation of the hardware-based symmetric encryption algorithm.

15. The non-transitory computer readable medium of claim 14, wherein the single implementation of the hardware-based symmetric encryption algorithm is utilized to generate a symmetric encryption of the hardware-based authenticator.

16. The non-transitory computer readable medium of claim 15, wherein the single implementation of the software-based one-way pseudorandom function utilizes the password and the symmetric encryption of the hardware-based authenticator.

17. The non-transitory computer readable medium of claim 11, wherein the hash is computed by utilizing the single implementation of the software-based one-way pseudorandom function before the single implementation of the hardware-based symmetric encryption algorithm.

18. The non-transitory computer readable medium of claim 17, wherein the single implementation of the software-based one-way pseudorandom function generates a hash of the password.

19. The non-transitory computer readable medium of claim 18, wherein the single implementation of the hardware-based symmetric encryption algorithm generates a symmetric encryption of the hardware-based authenticator.

20. A system, comprising:
a memory storing instructions, and
a computer processor executing the instructions for:
receiving a request to access software utilizing password-based authentication;
receiving a password for the password-based authentication;
computing a hash utilizing the password and a hardware-based authenticator associated with hardware of the system, wherein the hash is computed utilizing a combination of a single implementation of a hardware-based symmetric encryption algorithm provided by a hardware-backed cryptographic module of the system and a single implementation of a software-based one-way pseudorandom function; and
verifying that the hash computed utilizing the password and the hardware-based authenticator is correct for accessing the software.

* * * * *